US005672231A

United States Patent [19]

Willkens et al.

[11] Patent Number: 5,672,231

[45] Date of Patent: Sep. 30, 1997

[54] METHOD AND APPARATUS FOR REMOVING LABEL FROM A CONTAINER

[75] Inventors: Daniel N. Willkens, Freeville, N.Y.; Neal D. Turner, Brackney, Pa.

[73] Assignee: Brandt Technologies, Inc., Windsor, N.Y.

[21] Appl. No.: 408,576

[22] Filed: Mar. 22, 1995

[51] Int. Cl.[6] ........ B32B 35/00

[52] U.S. Cl. ........ 156/344; 156/584; 15/65; 15/70; 15/316.1; 15/318.1; 15/405; 134/33; 134/37; 134/151

[58] Field of Search ........ 156/234, 240, 156/344, 584; 15/59, 60, 65, 70, 316.1, 318.1, 405; 134/33, 37, 151, 172

[56] References Cited

U.S. PATENT DOCUMENTS

| | | | |
|---|---|---|---|
| 4,013,497 | 3/1977 | Wolf | 156/154 |
| 4,220,481 | 9/1980 | Bleiman et al. | 156/584 X |
| 4,325,775 | 4/1982 | Moeller | 156/584 |
| 4,661,195 | 4/1987 | Hopson | 156/344 |
| 4,717,442 | 1/1988 | Hopson | 156/584 |
| 4,834,826 | 5/1989 | Abe et al. | 156/344 |
| 5,152,865 | 10/1992 | Hurst | 156/344 |
| 5,217,538 | 6/1993 | Buchholz et al. | 134/25.4 |
| 5,317,794 | 6/1994 | Lerner et al. | 29/426.3 |
| 5,372,672 | 12/1994 | Seifert et al. | 156/344 X |

FOREIGN PATENT DOCUMENTS

| | | | |
|---|---|---|---|
| 48-18938 | 6/1973 | Japan | 156/344 |
| 58-118207 | 7/1983 | Japan | 156/344 |

OTHER PUBLICATIONS

Pp. 35 from EXAIR Corporation Catalogue (Received 12-1994).

*Primary Examiner*—Mark A. Osele

*Attorney, Agent, or Firm*—Sughrue, Mion, Zinn, Macpeak, and Seas.

[57] ABSTRACT

Method and apparatus for removing a label from a container which includes a cylindrical surface, by blowing air so as to be incident tangentially with respect to the cylindrical surface of the container and flow along the container surface toward a leading edge of the label as the container is rotated. An air knife having an air exit slit and a substantially planar surface disposed adjacent to and substantially perpendicular to the air exit slit utilizes the Coanda effect, such that air exiting from the air exit slit bends around and follows the substantially planar surface so as to flow tangentially to the cylindrical surface of the container and thereby remove the label as the container is rotated.

2 Claims, 5 Drawing Sheets

METHOD AND APPARATUS FOR REMOVING LABEL FROM A CONTAINER

BACKGROUND OF THE INVENTION

The present invention provides a method and apparatus for removing a label from a container and, in particular, a method and apparatus for removing a label from a container by blowing air so as to be incident tangentially with respect to a cylindrical surface of the container and flow along the container surface toward a leading edge of the label as the container is rotated.

In general, during the application of an ink only heat transfer label film to glass, metal or plastic containers, the label film is cut and applied around the container, thereby leaving a small gap between the leading and trailing edges of the applied label film. Once the transfer of the ink from the heat transfer label film has been effected, the label film is removed. Various methods and apparatuses have been disclosed for removing the label including mechanical devices such as a frictional force applying a member, and chemical means such as soaking in a solution to dissolve the adhesive.

It is also known from U.S. Pat. No. 4,661,195 (Hopson) to use a pair of air nozzles which provide air jets that force air between a label sleeve and an outer surface of a can to dislodge a label from the can. The cans are conveyed in a line along a conveyor. The air nozzles of Hopson '195 are arranged above the can and the can remains stationary during the ejection of air.

U.S. Pat. No. 4,834,826 (Abe et al.) discloses an apparatus and method for removing a label from a bottle by melting the label with hot air supplied by a hot air jet nozzle 10 having a vertically elongated slit. Accordingly, the label is cut by melting when exposed to the hot blast of air from the jet nozzle 10 which faces directly along the axis of the bottle as shown in FIG. 5 of Abe et al. The cut label is then blown off by pressurized air from four secondary nozzles 40.

U.S. Pat. No. 4,013,497 (Wolf), U.S. Pat. No. 4,325,775 (Moeller), U.S. Pat. No. 4,717,442 (Hopson) and U.S. Pat. No. 5,317,794 (Lerner et al.) all relate to various methods and apparatuses for delabeling.

SUMMARY OF THE INVENTION

It is an object of the present invention to provide a simple and reliable method and apparatus for removing a label from a container which includes a cylindrical surface.

It is a further object of the present invention to provide a method and apparatus for removing a label from a container which utilizes high velocity air as opposed to mechanical or other methods and apparatuses of removal, so as to remove a label or film substrate more reliably and completely.

It is a still further object of the present invention to provide a method and apparatus for removing an ink only heat transfer film from glass, metal, or plastic containers once the transfer of ink has been effected onto the container.

In particular, the present invention provides a method of removing a label from a container which includes a cylindrical surface, comprising the steps of rotating the container; and blowing air so as to be incident tangentially with respect to the cylindrical surface of the container and flow toward a leading edge of the label as the container rotates, such that the label is removed.

The air blowing step includes blowing air from an air knife slit such that the air exits in an initial direction and then bends around a surface of the air knife so as to flow tangentially to the cylindrical surface of the container.

The present invention also provides an apparatus for removing a label from a container including a cylindrical surface, comprising means for rotating the container; and means for blowing air so as to be incident tangentially with respect to the cylindrical surface of the container and flow toward a leading edge of the label as the container is rotated by the means for rotating, such that the label is removed.

The means for blowing air comprises an air knife having an air exit slit directed in an initial direction and a substantially planar surface disposed adjacent to and substantially perpendicular to the air exit slit, such that air exiting from the air exit slit bends around and follows the substantially planar surface so as to flow tangentially to the cylindrical surface of the container.

Also provided is a method of removing a label from a container which includes a cylindrical surface, the label having a leading edge and a trailing edge, the method comprising the steps of rotating the container; and blowing air such that the air impacts the container at a location upstream of the leading edge of the label and follows the cylindrical surface toward the leading edge of the label so as to meet the leading edge of the label as the container rotates, thereby to remove the label from the container.

The air blowing step may include blowing air so as to be incident tangentially with respect to the cylindrical surface of the container and then follow around the cylindrical surface of the rotating container to meet the leading edge of the label.

Alternatively, the air blowing step includes blowing air so as to be incident non-tangentially with respect to the cylindrical surface of the container and then follow around the cylindrical surface of the rotating container to meet the leading edge of the label.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Figure 2:
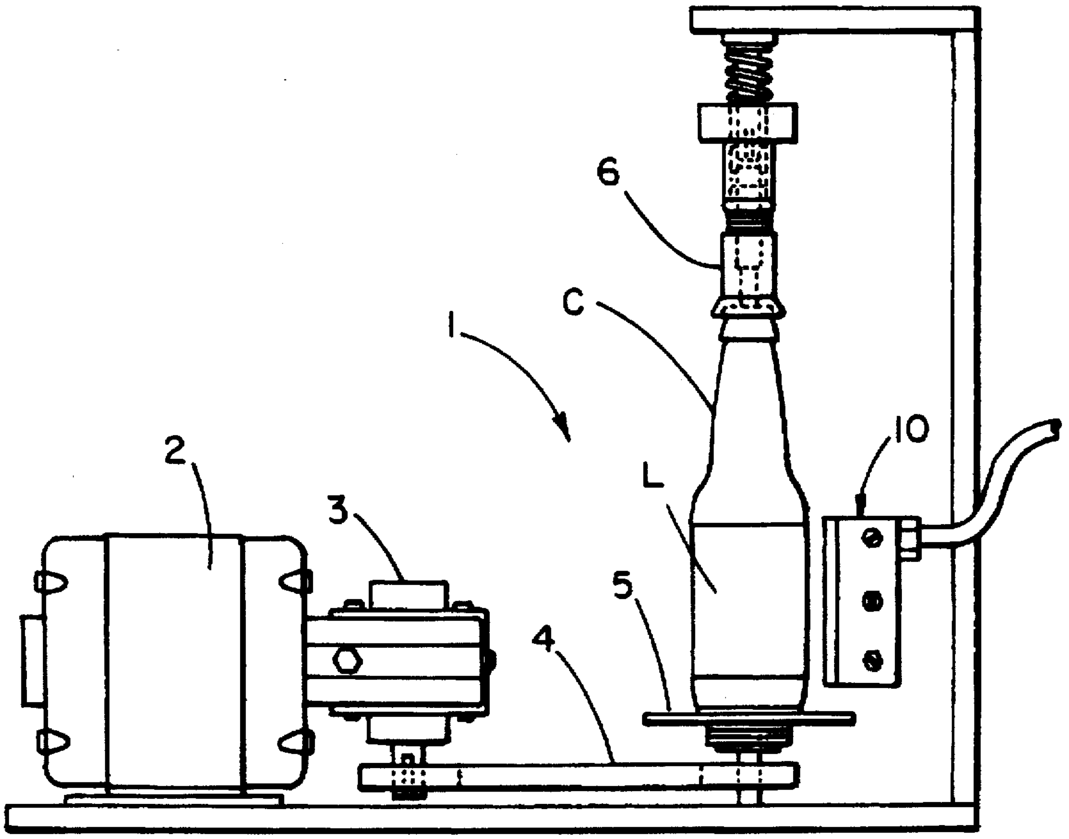
FIG. 2 illustrates the means for rotating the container and also an elevational view of the air knife.

The invention will now be described with reference to the drawings. More specifically, a container C made, for example, from glass, metal or plastic, is mounted for rotation on a means for rotating 1 which may comprise a drive motor 2, a gear reduction device 3, a drive belt 4, a rotatable container support 5, and a hold-down device 6 for holding the container C on the container support 5 (see FIG. 2). Accordingly, the drive motor 2 drives the drive belt 4 through the gear reduction means 3 so as to rotate the container support 5. The hold-down device 6 holds the container C on the container support 5, while permitting the container to rotate together with the container support 5 during removal of the label, as will be discussed in more detail below.

Figure 1A:
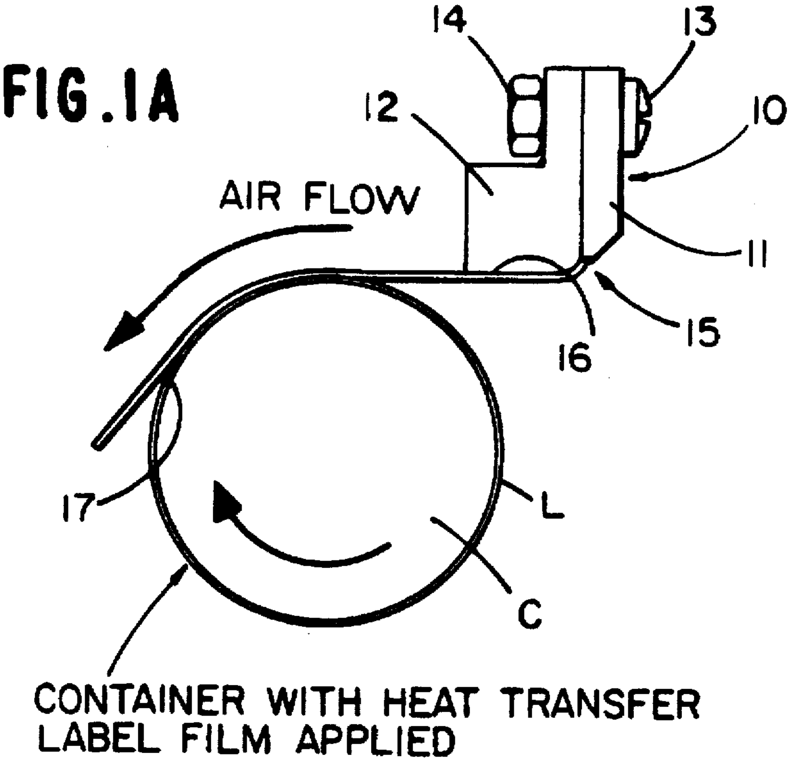
FIGS. 1A, 1B, 1C and 1D are schematic explanatory illustrations of the present invention as viewed from the top and show removal of a label film throughout the removal process according to one embodiment of the present invention.

As shown in FIG. 1A, the label film L has been cut and applied around a container. Once the transfer of the ink from the heat transfer label film or film substrate has been effected, the label film must then be removed. The present invention is directed to a method and apparatus for removing such a heat transfer label film or a label in general (hereinafter referred to simply as the "label"). A means for blowing air is mounted such that the air flow is directed so as to be incident along a tangent to the diameter of a cylindrical surface of the container C. The means for blowing air may take the form of an air knife, air curtain, or the like. The drawing figures of the present invention show an air knife 10. The air knife 10 comprises a pair of plates 11 and 12 which are fastened together by suitable fastening means such as a threaded member 13 and bolt 14 (only one of which fastening means is shown in FIGS. 1A–1D), so as to form an adjustable air knife exit slit 15 from which high velocity air exits. The plate 12 extends slightly beyond the edge of plate 11. As shown in the first embodiment of FIGS. 1A through 1D, the air knife 10 is oriented such that the air exit slit 15 of the air knife is directed so as to be perpendicular to a line which is tangent to the container C.

Plate 12 of the air knife 10 includes a substantially planar surface 16 disposed adjacent to and substantially perpendicular to the air exit slit 15. Accordingly, when air exits from the air exit slit 15, it bends around and follows the substantially planar surface 16 of the air knife 10 so as to flow tangentially to the cylindrical surface of the container C. Note that the distance between the plate 12 and the container C is exaggerated in FIG. 2 to avoid confusion. The reason the air bends around the substantially planar surface 16 is due to the fluid flow phenomenon known as the Coanda effect, also referred to as the wall attachment effect. The Coanda effect is the tendency of a flowing fluid to follow a surface against which the fluid is flowing even as the surface changes direction. The primary stream of air which follows the surface 16 also entrains surrounding air.

The present inventors have also observed that the Coanda effect transfers to the cylindrical surface of the container C such that the air flow attaches to the cylindrical container surface and bends around the diameter for a given distance as is apparent from FIGS. 1A through 1D. This results in a more efficient use of the air supply for a given air velocity.

Thus, by taking advantage of the Coanda effect, rather than point the air knife slit 15 directly at the leading edge 17 of the label L, the air knife 10 is arranged as shown in FIGS. 1A through 1D such that the air slit 15 is directed at a position off-set from the rotational axis of the container C.

The operation of the present invention will now be described with reference to FIGS. 1A through 1D.

Again, once the transfer of the ink from the heat transfer label film has been effected, the label or film substrate L is then removed from the container C. In order to effect removal of the label L, the air knife 10 is mounted as described in detail above such that the air flow will be directed so as to be incident tangentially with respect to the cylindrical surface of the container C. The container C is rotated by the rotating means 1 shown in FIG. 2 and air is then blown from the air knife 10 and the air bends around the one plate member 12 of the air knife 10 due to the Coanda effect as explained above so as to be incident tangentially to the container C and then continues to flow around the container surface toward the leading edge 17 of the label L as the container is rotated.

Figure 1B:
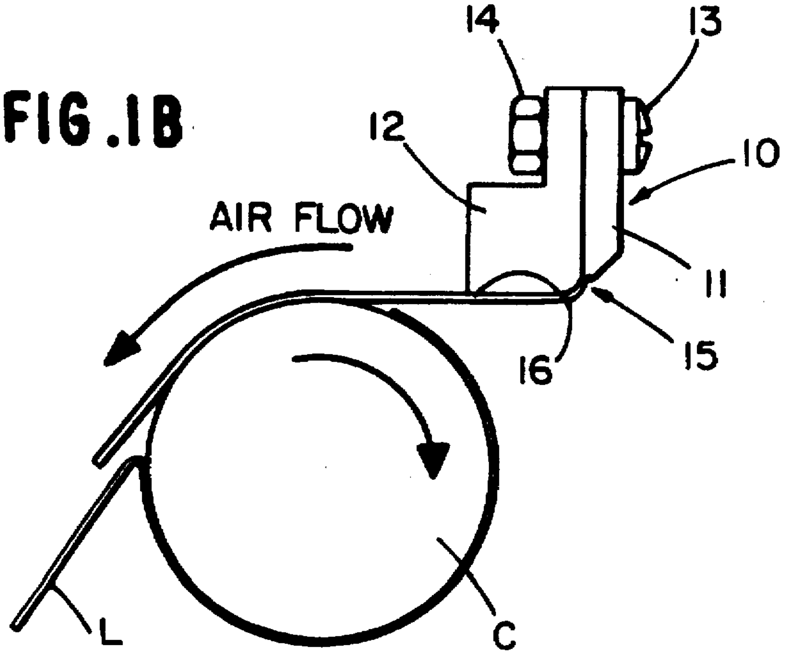
Figure 1C:
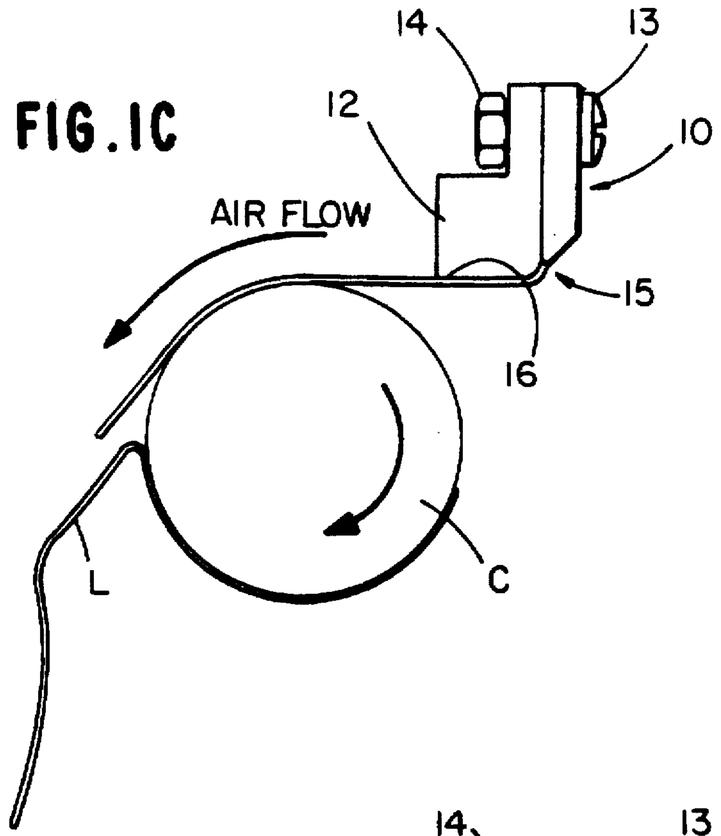
Figure 1D:
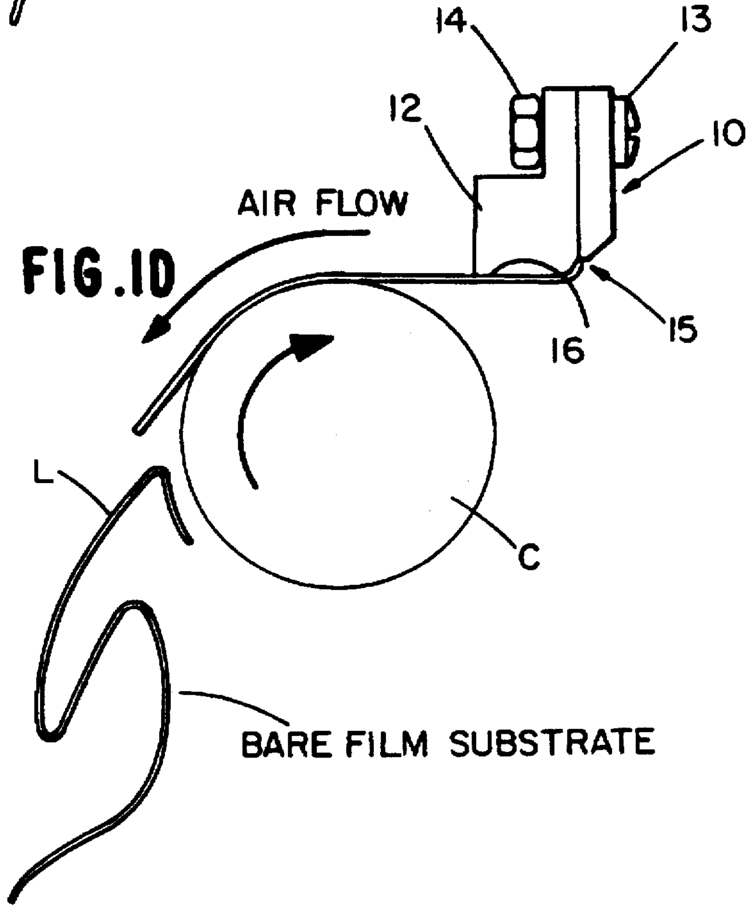

As the container C continues to rotate, the label L begins to peel off as the air meets the leading edge 17 as shown in FIG. 1B. Continued rotation permits the air flow to blow off the remaining portion of the label as shown in FIGS. 1C and 1D. After the container C makes one full rotation with the air flow blowing tangentially with respect to the container, the label n is blown free from the container, thereby leaving the ink only on the container. The ink on the container corresponds, for example, to a beverage label or the like.

The timing of the on and off of the air flow from the air knife 10 with respect to the rotation of the container C may be controlled by any suitable control means, such as a microprocessor, computer, or the like.

EXAMPLE 1

A container, having the ink transferred from the heat transfer label film or carrier, was delivered to a position in front of an air knife. The previously applied label film was formed of polypropylene material and is 3.75" wide, 7.125" long, and 0.002" thick. The container was a standard 12 oz. long neck beer bottle having a label panel diameter of 2.38". The air knife was 4.00" high and had an air slit width of 0.005" and a length of 3.5". The air knife face or blowing surface was positioned 0.5" from the container surface such that the air velocity was directed at the container surface and slightly tangent to the container with the air velocity opposing the rotation of the container. The container with the label film applied was then rotated at 176 rpm in front of the air knife. The air was applied at 80 psi with a consummation rate of 200 SCFM. The air was turned on at a point in the container rotation so as to meet the leading edge of the label film on the bottle. The air was on for 1.5 rotations of the container. During the rotation, the label film was blown cleanly from the container leaving the transferred ink undamaged. The removed label film was transported by the air stream to collection devices and then separated from the air stream.

EXAMPLE 2

It was further discovered that for the best results, the air knife air slit should be at least equal to or slightly longer than the width of the label film being removed. The following exemplary test was conducted:

The label film length was 7.1"

The label film width was 3.75"

The container diameter was 2.45"

The container was rotated at 250 rpm

The air pressure at the air knife was 60 psi

The air knife air slit gap was 0.004"

TABLE

| Label Film Width | Air-Knife Slot Length | Observed Film Removal |
|---|---|---|
| 3.75" | 4.25" | Excellent |
| 3.75" | 4.0" | Excellent |
| 3.75" | 3.5" | Marginal |
| 3.75" | 3.0" | Poor |

With respect to the above, the film removed with the "Excellent" observation was done without wrinkles or distortion, and was fully removed before one full revolution.

On the other hand, the film removal indicated as "Marginal" was wrinkled and required a complete revolution. Finally, the film removal indicated as "Poor" was characterized by the label film not being fully removed.

Figure 3:
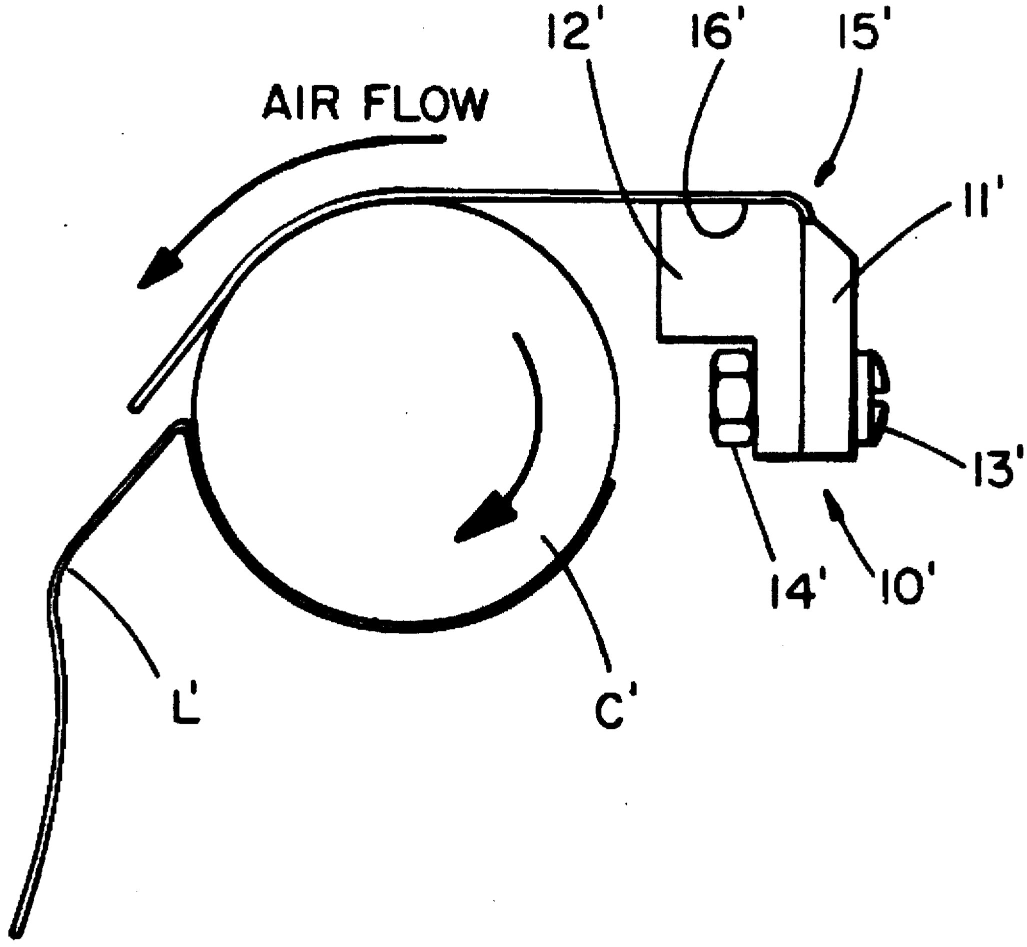
FIG. 3 is a schematic illustration as viewed from the top of a further embodiment according to the present invention.

FIG. 3 shows an alternative embodiment of the present invention which likewise utilizes the Coanda effect such that the air flow exiting from an air knife slit 15' bends around a substantially planar surface 16' of the air knife 10' so as to flow tangentially to the cylindrical surface of the container C'. However, in the embodiment of FIG. 3, the air knife 10' is arranged adjacent to the container C' (i.e., the mirror image of the first embodiment) so that the air exit slit 15' of the air knife 10' points away from the container C'. Note that like elements are denoted by the same reference numeral except that a prime is included.

Figure 4:
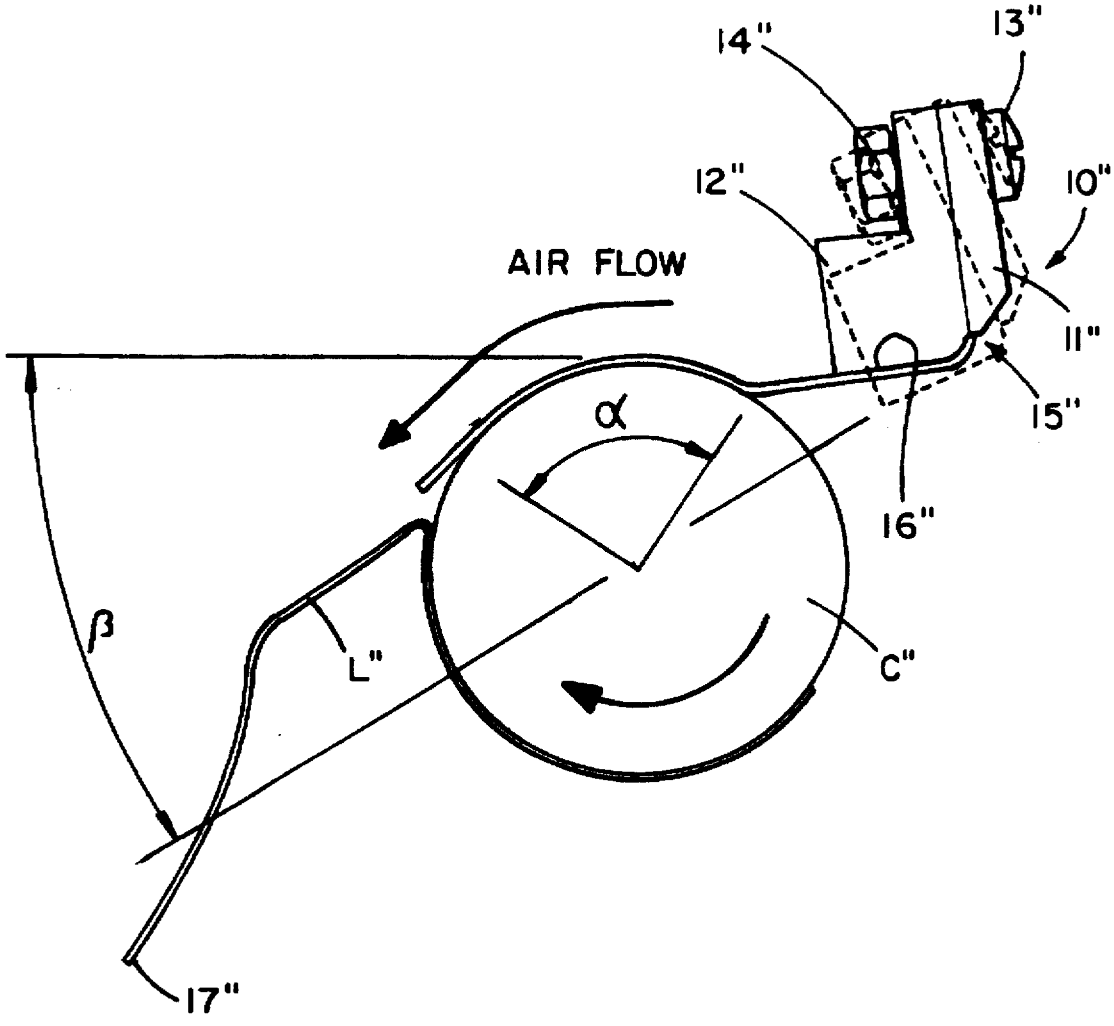
FIG. 4 is a schematic illustration as viewed from the top of a still further embodiment according to the present invention.

FIG. 4 shows a still further embodiment where the air knife 10" is slightly canted such that the air flow strikes the container C" in a non-tangential fashion and then follows around the cylindrical surface of the container C" until it meets the leading edge 17" of the label L" and thereafter removes the label L" in a manner similar to that of the first embodiment. Like elements are denoted by the same reference numeral except that a double prime is included.

More specifically, in the FIG. 4 embodiment, the angle $\beta$ of the air knife in relation to the container effects the air flow. As observed, the air flow will follow around the surface of the container anywhere from 90° to 120° (see angle $\alpha$). This "following" effect takes place with the knife being in a range from tangent (0°) (see FIGS. 1A–1D) to about 40° rotated toward the container. From 40° to 50°, the air flow follows the container only slightly, but in both directions around the container thereby reducing the ability to remove the label film. From 50° to 90°, the effect of the air following is the same as from tangent (0°) to 40° except in the opposite direction around the container.

While a single air knife is shown in the embodiments, it should be understood that several of such air knives may be mounted in series and timed to the rotation of a plurality of containers for high speed continuous applications.

It is contemplated that numerous modifications may be made to the method and apparatus for removing a label from a container of the present invention without departing from the spirit and scope of the invention as defined in the following claims.

What is claimed is:

1. A method of removing a label from a container which includes a cylindrical surface, the label having a leading edge and a trailing edge, said method comprising the steps of:

a) rotating the container; and b) blowing air such that the air impacts the container at a location upstream of the leading edge of the label and follows the cylindrical surface toward the leading edge of the label so as to meet the leading edge of the label as the container rotates, thereby to remove the label from the container, wherein said air blowing step includes blowing air so as to be incident non-tangentially with respect to the cylindrical surface of the container and then follow around the cylindrical surface of the rotating container to meet the leading edge of the label.

2. The method according to claim 1, wherein said air blown in said air blowing step follows around the cylindrical surface of the container in the range of 90° to 120° between the location where the air impacts the container to where the air meets the leading edge of the label.

* * * * *